United States Patent
Lin et al.

(10) Patent No.: US 9,484,000 B2
(45) Date of Patent: Nov. 1, 2016

(54) SIGNAL CONVERSION METHOD FOR DISPLAY IMAGE

(71) Applicant: Au Optronics Corporation, Hsinchu (TW)

(72) Inventors: Hui-Feng Lin, Taichung (TW); Sheng-Wen Cheng, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 12 days.

(21) Appl. No.: 14/572,781

(22) Filed: Dec. 17, 2014

(65) Prior Publication Data
US 2015/0348500 A1 Dec. 3, 2015

(30) Foreign Application Priority Data
May 29, 2014 (TW) .............................. 103118775 A (51) Int. Cl.
| | |
|---|---|
| G09G 5/10 | (2006.01) |
| G09G 5/02 | (2006.01) |
| G06K 9/42 | (2006.01) |
| G06T 7/40 | (2006.01) |
| G06T 11/00 | (2006.01) |
| H04N 1/60 | (2006.01) |
| H04N 1/46 | (2006.01) |
| G09G 3/34 | (2006.01) |
| G09G 5/06 | (2006.01) |
| G06K 9/46 | (2006.01) |
| G06K 9/00 | (2006.01) |

(52) U.S. Cl.
CPC ............... *G09G 5/02* (2013.01); *G06T 7/408* (2013.01); *G09G 3/3406* (2013.01); *G09G 5/06* (2013.01); *G09G 5/10* (2013.01); *G06K 9/00691* (2013.01); *G06K 9/00697* (2013.01); *G06K 9/4652* (2013.01); *G09G 2320/0276* (2013.01); *G09G 2320/064* (2013.01); *G09G 2320/0646* (2013.01); *G09G 2320/103* (2013.01); *G09G 2340/06* (2013.01)

(58) Field of Classification Search
CPC combination set(s) only.
See application file for complete search history.

(56) References Cited

U.S. PATENT DOCUMENTS

| | | | |
|---|---|---|---|
| 7,696,964 B2 | 4/2010 | Lankhorst et al. | |
| 8,310,438 B2 * | 11/2012 | Shishido | G09G 3/342 345/102 |
| 8,368,726 B2 * | 2/2013 | Amino | G09G 3/3426 345/102 |
| 8,411,104 B2 * | 4/2013 | Arashima | G09G 3/3648 345/589 |
| 8,520,023 B2 | 8/2013 | Sullivan et al. | |
| 8,581,275 B2 * | 11/2013 | Omoto | H01L 27/3211 257/40 |
| 8,643,710 B2 * | 2/2014 | Ono | A61B 1/045 348/234 |
| 8,878,757 B2 * | 11/2014 | Yoshida | G09G 3/3406 345/84 |
| 9,000,345 B2 * | 4/2015 | Liu | G01J 1/46 250/214 AL |
| 9,196,189 B2 * | 11/2015 | Gandhi | G09G 3/2029 |

(Continued)

FOREIGN PATENT DOCUMENTS

TW I427608 2/2014

*Primary Examiner* — Wesner Sajous
(74) *Attorney, Agent, or Firm* — Jianq Chyun IP Office (57) ABSTRACT

A signal conversion method for a display image is provided. The signal conversion method includes: receiving an image data of the (N−1)th frame; converting the (N−1)th image data to obtain a luminance data; determining a signal tuning gain of an image data of Nth frame according to the image data of the (N−1)th frame, the luminance data and a backlight duty adjusting table; adjusting an image data of Nth frame according to the signal tuning gain of Nth frame so as to generate an output image data of Nth frame; and displaying pixels according to the output image data of Nth frame.

13 Claims, 5 Drawing Sheets

(56) References Cited

U.S. PATENT DOCUMENTS

2008/0284719 A1* 11/2008 Yoshida ............ G02F 1/136277 345/102

2011/0025732 A1* 2/2011 Wang ................... G09G 3/3611 345/691

* cited by examiner

SIGNAL CONVERSION METHOD FOR DISPLAY IMAGE

CROSS-REFERENCE TO RELATED APPLICATION

This application claims the priority benefit of Taiwan application serial no. 103118775, filed on May 29, 2014. The entirety of the above-mentioned patent application is hereby incorporated by reference herein and made a part of this specification.

BACKGROUND OF THE INVENTION

1. Field of the Invention

The present disclosure relates to a signal conversion method for a display image, and more particularly, a signal conversion method for a display image in the application of a wide-color-gamut display.

2. Description of Related Art

As electronic technology advances, outdoor use of display apparatuses has been increased; and under strong outdoor lighting, display apparatuses are required to provide higher luminance for users to view the display screen clearly. Therefore, in order to improve transmittance of the display panel, the practice of adding brightness (W) sub-pixels to a liquid crystal display of three primary colors (R, G, B) is a solution that has recently received widespread attentions. The brightness sub-pixels being added into the RGBW liquid crystal display have very high transmittance, and thus may significantly improve the transmittance of the liquid crystal panel. When the display screen is full bright, luminance is nearly doubled, and power consumption is also relatively lowered. When the product is used outdoor, due to its high luminance characteristic, the user may also view clearer images. However, when the RGBW liquid crystal display simultaneously displays pure colors and white screen, R, G and B sub-pixels, due to having areas less than that of the RGB liquid crystal display of the same resolution, may cause the brightness of the pure colors to become dark, and thereby may appear to have a poor quality in human eyes.

The introduction of wide-color-gamut panel technology may other be another feasible technical solution. The wide-color-gamut panel may increase a color gamut value of the existing National Television System Committee (NTSC) from 72% to approximately above 90% and use the NTSC's characteristic of high color gamut value to improve the pure color screen problem of the RGBW display. However, color resistance in the color filter adopted by the conventional wide-color-gamut liquid crystal display may lower the transmittance, and luminous efficiency of the multi-wavelength backlight module adopted by the wide-color-gamut liquid crystal display is low, such that these two factors would both lead to an increase in power consumption.

The two technologies described in above each have its own advantages and disadvantages that can be complemented, and thus it is very desirable to develop and integrate a RGBW conversion and a wide-color-gamut color integration algorithm. Computation process of the existing RGB to RGBW conversion algorithm is very complicated, thereby causing the computation speed under a high resolution screen to be very slow.

SUMMARY OF THE INVENTION

The present disclosure is directed to a signal conversion method for a display image for improving the quality of the display image.

The signal conversion method for the display image of the present is adapted for a display including a plurality of pixels, and the signal conversion method includes: receiving an image data of the (N−1)th frame through the display, wherein the image data comprises a red pixel data, a blue pixel data and a green pixel data corresponding to each pixel; obtaining a luminance data according to the image data of the (N−1)th frame; determining a signal tuning gain of the Nth frame according to the image data and the luminance data of the (N−1)th frame and through a backlight duty adjusting table, wherein the backlight duty adjusting table includes a plurality of backlight luminances and a plurality of gains respectively corresponded by a plurality of luminance distribution ranges; adjusting an image data of the Nth frame according to the signal tuning gain of the Nth frame so as to generate an output image data of the Nth frame, wherein the output image data includes a red output sub-pixel data, a green output sub-pixel data, a blue output sub-pixel data and a white output sub-pixel data; and displaying the pixel by the display according to the output image data of the pixel.

In view of the above, the present disclosure obtains the corresponding luminance data by converting the red pixel data, the blue pixel data and the green pixel data of the pixel of the Nth frame, and uses the luminance data to perform the selection of the backlight duty cycle and the calculation of the adjusted image data, thereby reducing the time required for the hardware computation and achieving better power saving effect.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
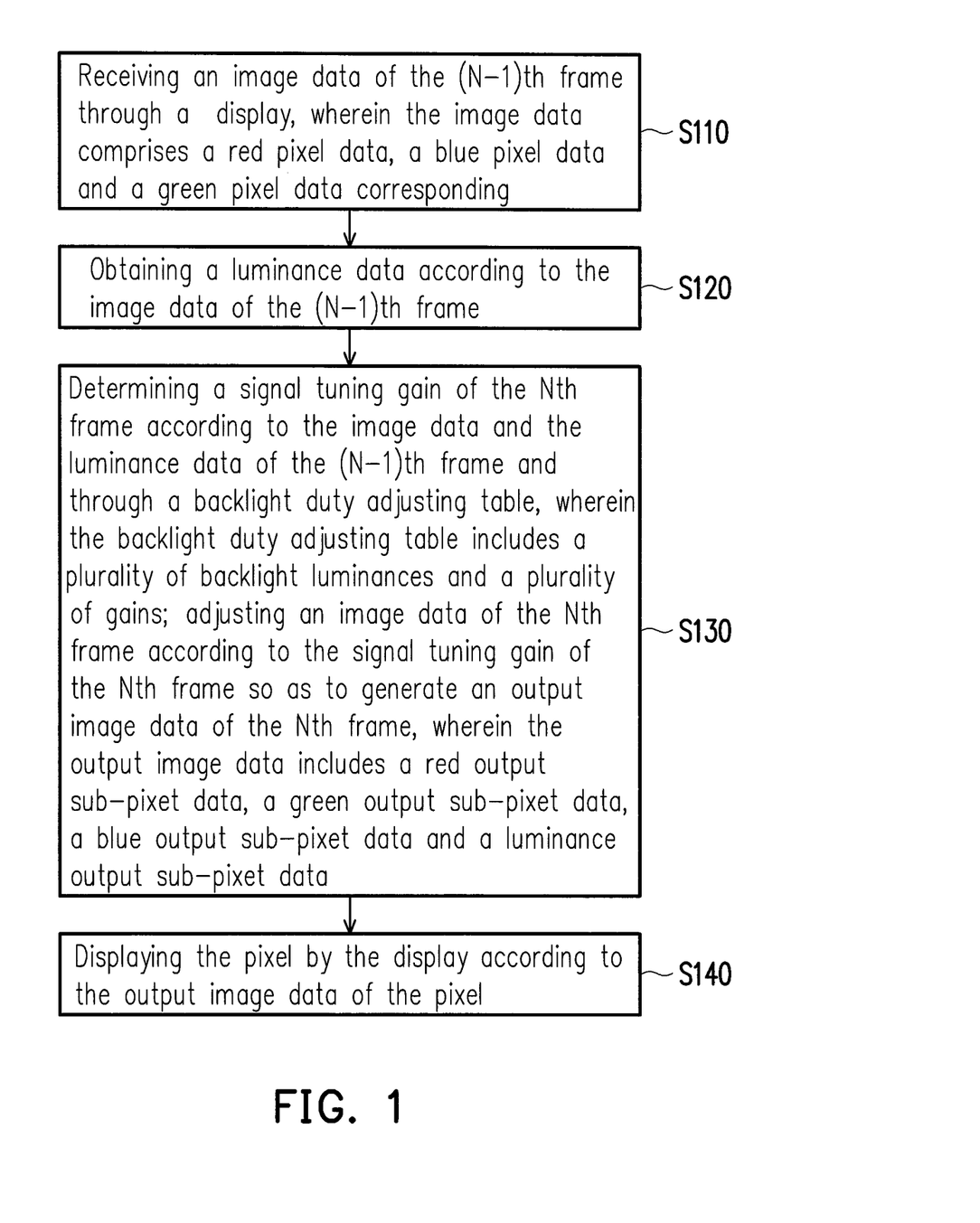
FIG. 1 is a flow chart illustrating a signal conversion method for a display image according to an embodiment of the present disclosure.

Referring to FIG. 1, FIG. 1 is a flow chart illustrating a signal conversion method for a display image according to an embodiment of the present disclosure. The signal conversion method for the display image is adapted for a display (such as RGBW display). The display of the present embodiment may be a wide-color-gamut display, and the display includes a plurality of pixels. Each pixel has red, blue, green and brightness sub-pixels. In step S110, an image data of the (N−1)th frame is obtained via the display, wherein the image data includes a red pixel data, a blue pixel data and a green pixel data corresponding to each pixel. Then, in step S120, the image data of the (N−1)th frame is converted into a luminance data, wherein the image data of the (N−1)th frame may be converted from RGBW (red, green, blue, white) format to YCbCr format in the step S120, thereby obtaining the corresponding luminance data (Y).

In step S130, a signal tuning gain of the Nth frame is decided according to the image data and the luminance data of the (N−1)th frame and through a backlight duty adjusting table, wherein the backlight duty adjusting table may be established based on the corresponding luminance data (Y).

In the backlight duty adjusting table, luminance distribution ranges of the image data are separated into a plurality of intervals, and a backlight duty cycle and a gain corresponded by each interval of luminance distribution range are recorded in the backlight duty adjusting table; for instance, the backlight duty adjusting table may be configured as shown in Table 1 below:

TABLE 1

| Luminance | 255-241 | 240-225 | 224-209 | 208-193 | 192-177 | 176-0 |
|---|---|---|---|---|---|---|
| Backlight duty cycle | 100% | 94.12% | 88.89% | 84.21% | 80% | 76.19% |
| Gain | 1 | 1.06 | 1.125 | 1.1875 | 1.25 | 1.31 |

Wherein, the backlight duty cycle may record, in a frame cycle, a duty (such as Duty Cycle) of the backlight when the backlight is turned-on and the gain may record a scale of enlargement for a gray level of the image data. Values in the backlight duty adjusting table may be set according to user preferences and display panel characteristics.

Next, the obtained luminance data is found through using the backlight duty adjusting table, so as to obtain a plurality of nominated backlight duty cycles and a plurality of nominated gains corresponding to the pixel data, wherein one of the corresponding nominated backlight duty cycles is selected as the backlight duty cycle, and one of the corresponding nominated gains is selected as the signal tuning gain.

Herein, since there are several luminance data of the pixels in the image data of the (N−1)th frame, searching actions performed through the backlight duty adjusting table targeting each luminance data allow a plurality of corresponding backlight duty cycles to be obtained, and each backlight duty cycle correspondingly has a different or same number of pixels. In an embodiment of the present disclosure, the backlight duty cycle having a corresponding pixel number greater than the total pixel number of one frame by a certain ratio (such as a critical number) may be selected, wherein the largest backlight duty cycle is the selected backlight duty cycle, and the critical number may be a value less than 1 (such as 4%). For instance, assuming the pixel number corresponding to the largest backlight duty equal to 100% is less than 4% of the total pixel number of one frame, then the backlight duty equaling 100% would be discarded and would not be selected as the selected backlight duty; while the pixel number corresponding to the second largest backlight duty equal to 94% is greater than 4% of the total pixel number of one frame, then the backlight duty cycle equaling 94% would be selected as the selected backlight duty.

In step S140, the image data of the Nth frame is adjusted according to the signal turning gain of the Nth frame so as to generate an output image data of the Nth frame, wherein the output image data of the Nth frame includes a red output sub-pixel data, a green output sub-pixel data, a blue output sub-pixel data and a white output sub-pixel data.

In an embodiment of the present disclosure, the backlight duty may be controlled by current modulation or pulse width modulation.

Figure 2:
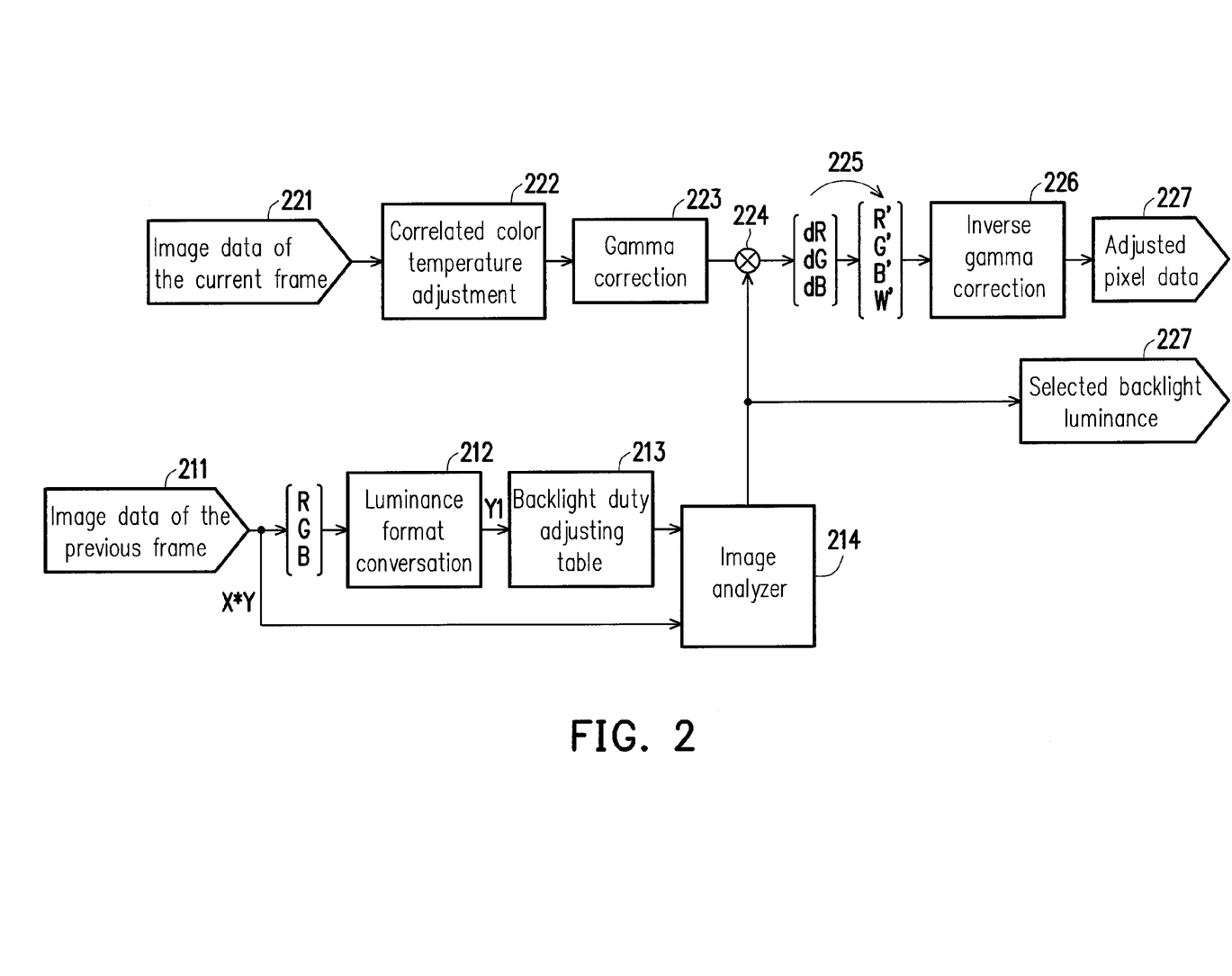
FIG. 2 is a schematic diagram illustrating a signal conversion method for a display image according to an embodiment of the present disclosure.

Referring to FIG. 2, FIG. 2 is a schematic diagram illustrating a signal conversion method for a display image according to an embodiment of the present disclosure. Wherein, a resolution of an image data 211 of the previous frame (viz., the image data of the (N−1)th frame) is X*Y and received in RGB format, and a plurality of luminance data Y1 is obtained via a luminance format conversation 212. The luminance data Y1 are transmitted to the backlight duty adjusting table 213, and a plurality of backlight duty cycles corresponding to the image data and a plurality of nominated gains corresponding to the backlight duty are obtained through the searching actions. An image analyzer 214 receives the backlight duty cycles, the nominated gains and the resolution X*Y, and selects the selected backlight duty cycle 215 and the signal tuning gain GAIN according to the corresponding pixel numbers of the backlight duty cycles. The selected backlight duty cycle 215 is provided as a basis for driving a backlight panel, and the signal tuning gain GAIN is supplied to a multiplier 224.

On the other hand, the image data 221 of the Nth frame (namely, the image data of the current frame) is been received, and actions such as correlated color temperature adjustment 222 and gamma correction 223 are performed, wherein the gamma correction 223 is configured to perform actions for converting a signal domain to luminance domain. The image date of the adjusted Nth frame is transmitted to the multiplier 224 for being computed with the signal tuning gain GAIN, so as to obtain an adjusted image data of the Nth frame. The adjusted image data of the Nth frame, after gone through a signal conversion action 225 of RGB to RGBW (red, green, blue, white) and being treated with an inverse gamma correction 226, may generate a final output image data 227, wherein the inverse gamma correction 226 is configured to covert a luminance domain signal into a signal domain signal.

Figure 3:
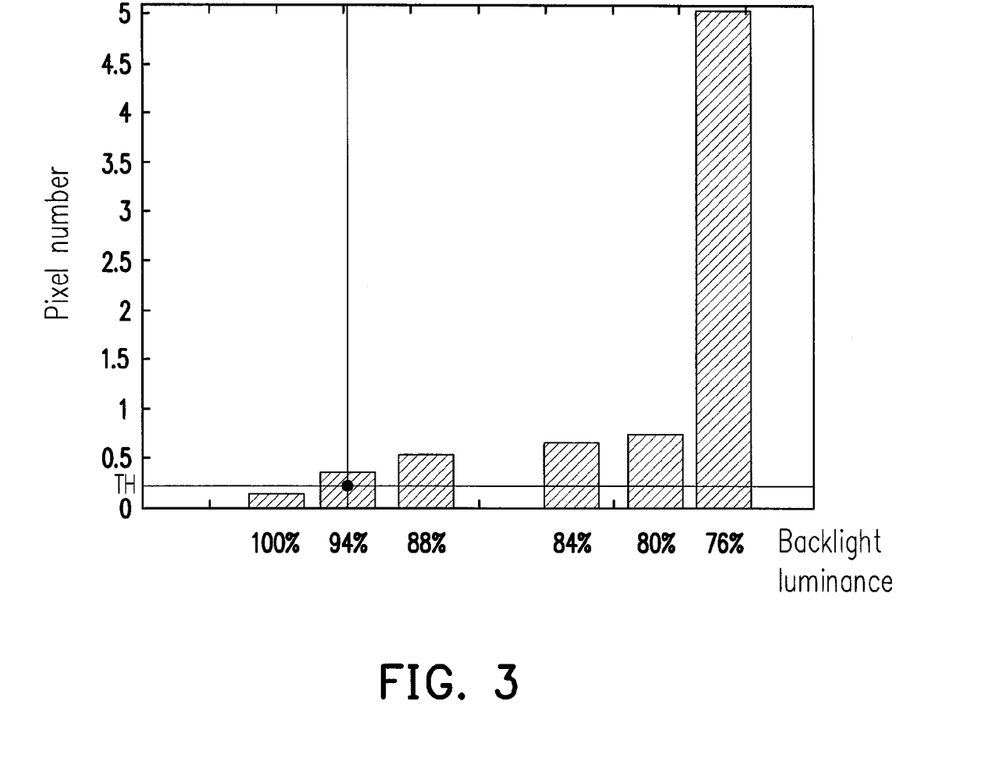
FIG. 3 is a relationship diagram of the nominated backlight duty cycles and the pixel numbers.

Additionally, about the actions for the image analyzer 214 to select the backlight duty cycle 215 and the signal tuning gain GAIN corresponding to the pixel data, please refer to a relationship diagram of the nominated backlight duty cycles and the pixel numbers illustrated in FIG. 3. In FIG. 3, the cumulative pixel numbers are sorted in order of the magnitude of the backlight duties, wherein the cumulative pixel numbers corresponding to the larger backlight duty cycles are sorted at the front, and the cumulative pixel numbers corresponding to the smaller backlight duty cycles are sorted at the back. The backlight duty cycle of 100% is corresponded to a pixel number less than a critical number TH, and the backlight duties of 94%, 88%, 84%, 80% and 76% are corresponded to pixel numbers greater than the critical number TH; therefore, the image analyzer 214 correspondingly select the nominated backlight duty cycles 94%, which has the largest backlight duty cycle among the backlight duty cycles of 94%, 88%, 84%, 80% and 76% sorted at the front, as the backlight duty cycle 215. After the selected backlight duty cycle 215 is generated, the image analyzer 214, through using the backlight duty adjusting table 213, may find a gain, corresponding to the selected backlight duty cycle 215, to be the signal tuning gain GAIN.

Noteworthily, the actions as described in the above embodiment illustrated in FIG. 1 and FIG. 2 may be actions performed when a display is operating under an indoor mode. Therefore, the display may firstly perform a detection action to detect whether the display is operating in an indoor or outdoor environment, and when the display is operating under the indoor mode, the adjustment action as described in the embodiment illustrated in FIG. 1 and FIG. 2 may be performed.

Figure 4:
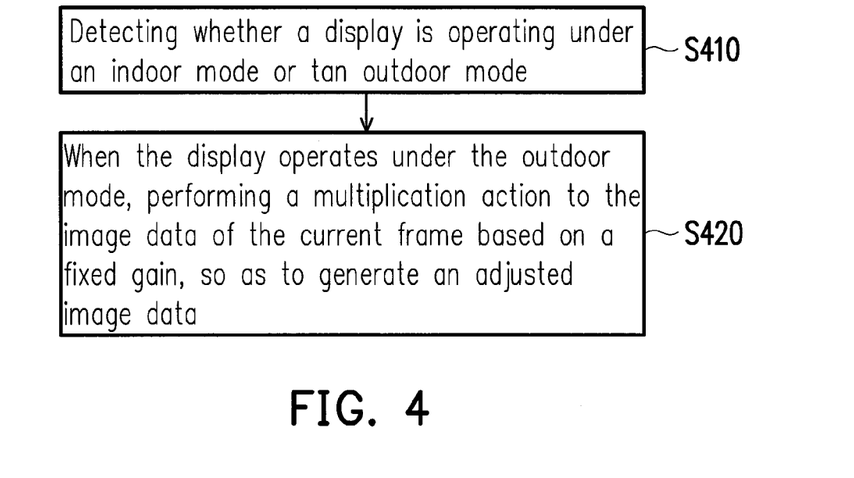
FIG. 4 is a flow chart illustrating signal conversion method for a display image according to another embodiment of the present disclosure.

Referring to FIG. 4, FIG. 4 is a flow chart illustrating signal conversion method for a display image according to another embodiment of the present disclosure. Wherein, in step S410, the detection action for detecting whether the display is operating under the indoor mode or the outdoor mode is performed. This detection action may be performed through detecting the brightness of ambient light in the environment where the display is located. For instance, when the detected brightness of the ambient light is greater than a critical value, it indicates that the display is operating under the outdoor mode; relatively, when the detected brightness of the ambient light is less than the critical value, then it indicates that the display is operating under the indoor mode.

In step S420, when the display operates under the outdoor mode, a fixed gain is accordingly used to multiply with the image data of the current frame (e.g., Nth frame), so as to generate the adjusted image data of the current frame (Nth frame). Then, the display may display each pixel on the panel according to the adjusted image data of the current frame.

Additionally, the backlight duty cycle of the display under the outdoor mode may be set to 100% or a fixed constant value.

The fixed gain may further be set according to the status of the display, and the engineer may preset an optimum value as the fixed gain based on the conditions of actual practice.

Figure 5:
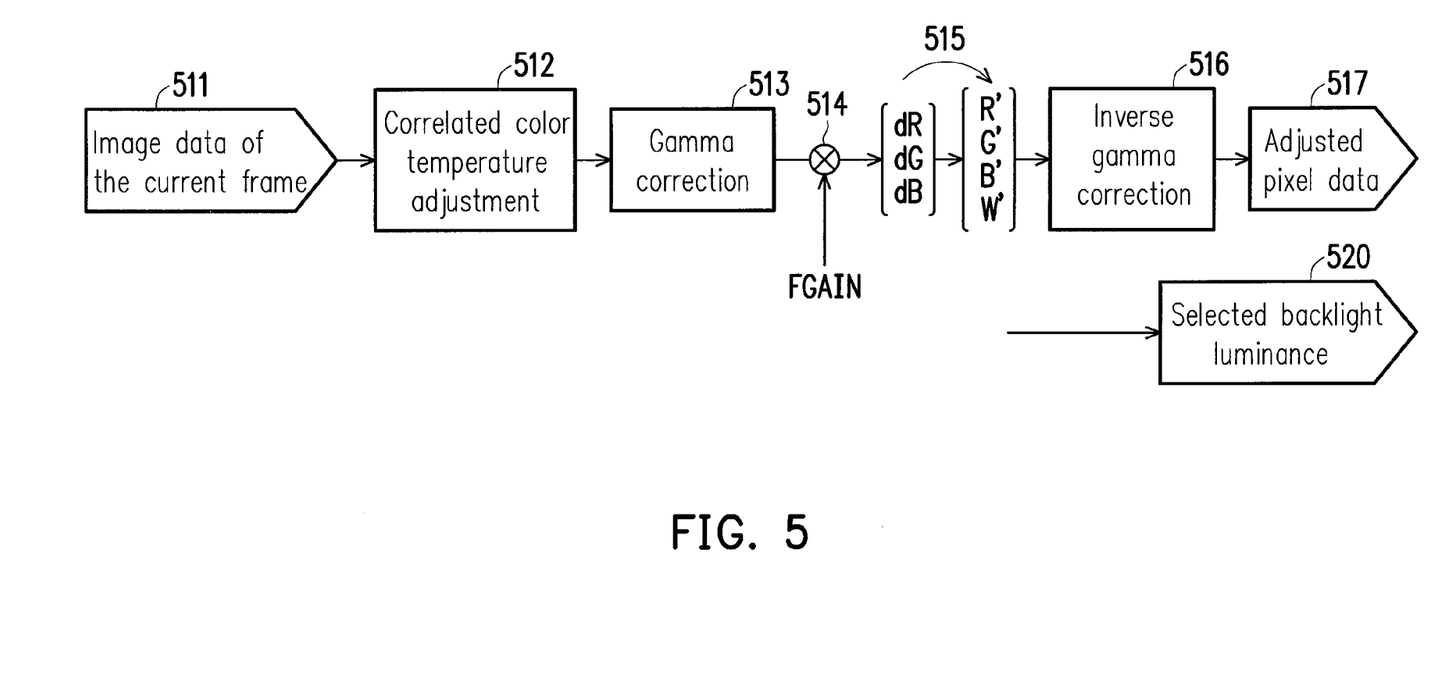
FIG. 5 is a schematic diagram illustrating the implementation of the embodiment in FIG. 4 of the present disclosure.

Referring to FIG. 5, FIG. 5 is a schematic diagram illustrating the implementation of the embodiment in FIG. 4 of the present disclosure. Wherein, the image data 511 of the current frame is received and adjusted by actions of correlated color temperature adjustment 512 and gamma correction 513, and then the adjusted image data is transmitted to a multiplier 514, and the adjusted image data is computed with the fixed gain FGAIN by the multiplier 514 for generating the adjusted image data, wherein the fixed gain FGAIN is, for example, equals 2. Next, after gone through a color coordinate conversion 515 of RGB to RGBW and an inverse gamma correction 516, a final output image data 517 may be generated. Moreover, in the present embodiment, a backlight duty cycle 520 may be set as a constant value, such as 100%.

Figure 6:
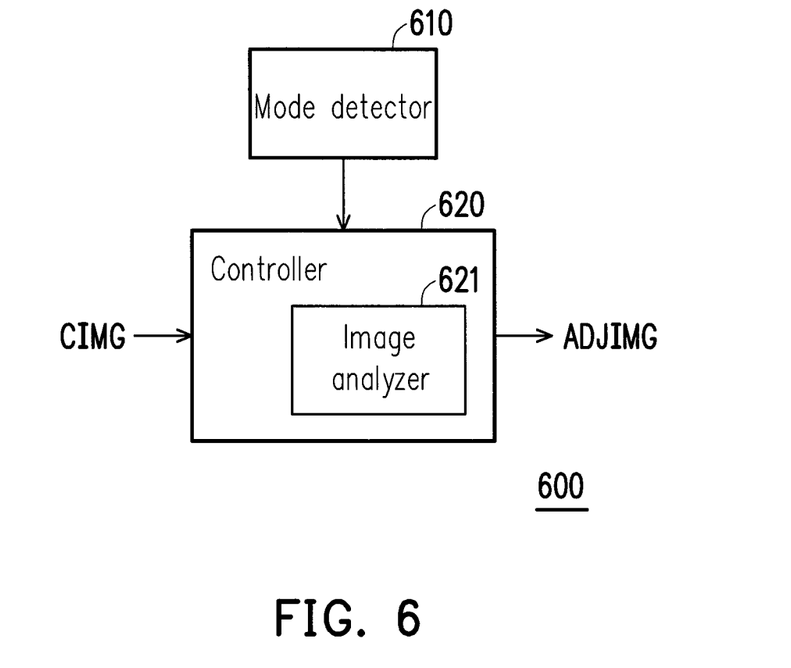
FIG. 6 is a schematic diagram illustrating a display according to an embodiment of the disclosure.

Referring to FIG. 6, FIG. 6 is a schematic diagram illustrating a display according to an embodiment of the disclosure. A display 600 (such as a RGBW display) includes a mode detector 610 and a controller 620. The controller 620 includes an image analyzer 621 therein. The operation mode detector 610 detects whether the display 600 is operating under the indoor mode or the outdoor mode. The controller 620 is coupled to the operation mode detector 610. The controller converts the image data of the (N−1)th frame into the a luminance format and obtain a plurality of luminance data, and may search through the backlight duty adjusting table targeting the luminance data to obtain a plurality of nominated backlight duty cycles and a plurality of nominated gains, respectively. The controller 620 selects one of the backlight duty cycles corresponding to the image data as the backlight duty cycle, and selects the corresponding gain as the signal tuning gain; and when the display 600 operates under the indoor mode, the controller performs multiplication on an image data CIMG of the Nth frame based on the signal tuning gain so as to generate an adjusted image data ADJIMG of the Nth frame. Wherein, the backlight duty adjusting table is established based on a plurality of backlight duty cycles and a plurality of gains that are respectively corresponded to a plurality of luminance distribution ranges.

As the controller continuously receives the image data in order of the timing, the image data received during the previous frame cycle may be used as the image data of the (N−1)th frame, and the currently received image data may be used as the image data of the Nth frame. The current image data of the Nth frame may be used as the image data of the (N−1)th frame (previous frame) of the next frame cycle.

Details regarding the actions of the controller 620 and the image analyzer 621 are described in the previous embodiments of the present disclosure in the above, and thus will not be repeated herein.

In an embodiment of the present disclosure, when the display 600 operates under the indoor mode, the backlight duty of the Nth frame satisfies the following relationship formulae:

$$0.75 \leq \frac{R_{255}}{W_{255}} \leq 0.77$$

$$0.75 \leq \frac{G_{255}}{W_{255}} \leq 0.77$$

$$0.75 \leq \frac{B_{255}}{W_{255}} \leq 0.77$$

$$0.75 \leq \frac{M_{255}}{W_{255}} \leq 0.77$$

Wherein, R255 is the backlight duty when the image data is a pure red screen image data, namely, the backlight turn-on time when the red pixel data is at the maximum gray level; W255 is the backlight duty when the image data is a pure white screen image data (R、G、B、W sub-pixels are turned on), namely, the backlight turn-on time when the red pixel data, the green pixel data and the blue pixel data are all at the maximum gray level; G255 is the backlight duty when the image data is a pure green screen image data, namely, the backlight turn-on time when the green pixel data is at the maximum gray level; B255 is the backlight duty when the image data is a pure blue screen image data, namely, the backlight turn-on time when the blue pixel data is at the maximum gray level; M255 is the backlight duty when the image data is a pure magenta screen image data, wherein a NTSC color gamut value of the display 600 may be greater than 90%.

Moreover, when the display 600 operates under the indoor mode, the backlight duty of the Nth frame may otherwisely satisfies:

$$0.94 \leq \frac{Y_{255}}{W_{255}} \leq 0.96$$

$$0.79 \leq \frac{C_{255}}{W_{255}} \leq 0.81$$

Wherein, Y255 is the backlight duty when the image data is a yellow screen image data, W255 is the backlight duty when the image data is a pure white screen image data (R、G、B、W sub-pixels are turned on), C255 is the backlight duty when the image data is a cyan screen image data, and the NTSC color gamut value of the display 600 may be greater than 90%.

On the other hand, when the display 600 of present embodiment operates under the outdoor mode, the image data of the Nth frame is the white image, and the red output sub-pixel data, the green output sub-pixel data, the blue output sub-pixel data and the white output sub-pixel data, after being normalized by the gamma conversion, respectively generate a normalized red output pixel data R, a normalized green output pixel data G, a normalized blue output pixel data B and a normalized luminance output pixel data W, wherein 0.45<=R=G=B=W<=0.5, the backlight duty of the Nth frame equals 100%, and the NTSC color gamut value of the display 600 is greater than 90%.

In summary, the present disclosure, through converting the image data into the luminance format, adjusting the proper backlight duties according to the brightness of the ambient light and the luminance data of the pixels, and performing the corresponding color gamut adjustment processing, may significantly reduce the hardware computation during the image processing, and under the premise of not increasing power consumption and product cost, may also maintain the quality of the display image, thereby enhancing the competitiveness of the display.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A signal conversion method for a display image adapted for a display comprising a plurality of pixels, each of the pixels having red, blue, green and brightness sub-pixels, the method comprising:
    receiving an image data of a (N−1)th frame through the display, wherein the age data comprises a red pixel data, a blue pixel data and a green pixel data corresponding to each pixel;
    obtaining a luminance data according to the image data of the (N−1)th frame;
    determining a signal tuning gain of a Nth frame according to the image data and the luminance data of the (N−1)th frame and through a backlight duty adjusting table, wherein the backlight duty adjusting table comprises a plurality of backlight luminances and a plurality of gains respectively corresponded by a plurality of luminance distribution ranges, and the signal tuning gain is determined based on an optimum among a plurality of backlight duties of the display generated according to the luminance data of the (N−1)th frame and the backlight duty adjusting table;
    adjusting an image data of the Nth frame according to the signal tuning gain of the Nth frame so as to generate an output image data of the Nth frame, wherein the output image data comprises a red output sub-pixel data, a green output sub-pixel data, a blue sub-output pixel data and a luminance output sub-pixel data; and
    displaying the pixel by the display for the display image according to the output image data of the pixel.

2. The signal conversion method for the display image as recited in claim 1, wherein determining the signal tuning gain according to the image data and the luminance data of the (N−1)th frame and through the backlight duty adjusting table further comprises:
    calculating a plurality of cumulative pixel numbers corresponding to the backlight duties of the (N−1)th frame based on the backlight duties, and sorting the cumulative pixel numbers in order of magnitude of the backlight duties; and
    when the cumulative pixel numbers sorted at the front are greater than a critical number, determining the optimum among the backlight duties corresponding to the cumulative pixel numbers sorted at the front.

3. The signal conversion method for the display image as recited in claim 1, wherein adjusting the image data of the Nth frame according to the signal tuning gain of the Nth frame so as to generate the output image data of the Nth frame comprises:
    converting the image data of the Nth frame into a luminance data of the Nth frame by a gamma conversion;
    after multiplying the luminance data with the signal tuning gain of the Nth frame, performing a signal conversion to generate an output luminance data of the Nth frame; and
    converting the output luminance data of the Nth frame into the output image data of the Nth frame via an inverse gamma conversion.

4. The signal conversion method for the display image as recited in claim 3 further comprising:
    determining a backlight duty of the Nth frame according to the signal tuning gain of the Nth frame.

5. The signal conversion method for the display image as recited in claim 1 further comprising:
    determining whether the display operates under an indoor mode or an outdoor mode.

6. The signal conversion method for the display image as recited in claim 5 further comprising: when the display operates under the outdoor mode, computing the image data according to a fixed gain so as to generate an adjusted image data of the Nth frame.

7. The signal conversion method for the display image as recited in claim 6, wherein the fixed gain equals to 2.

8. The signal conversion method for the display image as recited in claim 1, wherein the backlight duty is a reciprocal of the gain.

9. The signal conversion method for the display image as recited in claim 5, wherein when the display operates under the indoor mode, the backlight duty of the Nth frame satisfies:

$$0.75 \leq \frac{R_{255}}{W_{255}} \leq 0.77$$

$$0.75 \leq \frac{G_{255}}{W_{255}} \leq 0.77$$

$$0.75 \leq \frac{B_{255}}{W_{255}} \leq 0.77$$

$$0.75 \leq \frac{M_{255}}{W_{255}} \leq 0.77$$

wherein, R255 is a backlight duty when the image data is a pure red screen image data, W255 is a backlight duty when the image data is a pure white screen image data, G255 is a backlight duty when the image data is a pure green screen image data, B255 is a backlight duty when the image data is a pure blue screen image data, M255 is a backlight duty when the image data is a pure magenta screen image data, and a NTSC color gamut value of the display is greater than 90%.

10. The signal conversion method for the display image as recited in claim 5, wherein when the display operates under the indoor mode, the backlight duty of the Nth frame satisfies:

$$0.94 \leq \frac{Y_{255}}{W_{255}} \leq 0.96$$

wherein, Y255 is a backlight duty when the image data is a yellow screen image data, W255 is a backlight duty when the image data is a pure white screen image data, and a NTSC color gamut value of the display is greater than 90%.

11. The signal conversion method for the display image as recited in claim 5, wherein when the display operates under the indoor mode, the backlight duty of the Nth frame satisfies:

$$0.79 \leq \frac{C_{255}}{W_{255}} \leq 0.81$$

wherein, C255 is a backlight duty when the image data is a cyan screen image data, W255 is a backlight duty when the image data is a pure white screen image data, and a NTSC color gamut value of the display is greater than 90%.

12. The signal conversion method for the display image as recited in claim 5, wherein the backlight duties satisfy:

when the display operates under the outdoor mode, the image data of the Nth frame is a white image, and the red output sub-pixel data, the green output sub-pixel data, the blue sub-output pixel data and the luminance output sub-pixel data after being normalized by the gamma conversion respectively generate a normalized red output pixel data R, a normalized green output pixel data G, a normalized blue output pixel data B and a normalized luminance output pixel data W, wherein $0.45 <= R = G = B = W <= 0.5$, the backlight duty of the Nth frame equals 100%, and a NTSC color gamut value of the display is greater than 90%.

13. The signal conversion method for the display image as recited in claim 12, wherein the backlight duty is controlled by current modulation or pulse width modulation.

* * * * *